United States Patent [19]

Nagy

[11] Patent Number: 5,048,733

[45] Date of Patent: Sep. 17, 1991

[54] AUTOMOTIVE ACCESSORY MOUNT

[76] Inventor: Giselle F. Nagy, 7556 Hesperia Ave., Reseda, Calif. 91335

[21] Appl. No.: 371,841

[22] Filed: Jun. 27, 1989

[51] Int. Cl.$^5$ .............................................. B60R 7/00
[52] U.S. Cl. ........................... 224/42.42; 224/42.45 R; 224/42.01; 224/42.43; 224/277
[58] Field of Search ...................... 224/281, 277, 42.42, 224/42.43, 42.45 R, 42.01; 248/223.4, 311.2; 219/266, 267, 265

[56] References Cited

U.S. PATENT DOCUMENTS

| | | | |
|---|---|---|---|
| 488,851 | 12/1892 | Stock | 248/223.4 |
| 2,167,731 | 8/1939 | Swanstrom | 224/277 |
| 2,926,879 | 3/1960 | Dietrich | 248/223.4 |
| 4,071,174 | 1/1978 | Weiner | 224/277 |
| 4,721,276 | 1/1988 | Moss | 248/311.2 |
| 4,724,986 | 2/1988 | Kahn | 224/42.42 |
| 4,877,164 | 10/1989 | Baucom | 224/42.45 R |

Primary Examiner—Linda J. Sholl
Attorney, Agent, or Firm—Leon Gilden

[57] ABSTRACT

An automotive accessory mount is set forth for use in combination with an automotive cigarette lighter receptacle. The apparatus includes an enlarged, cylindrical base of a configuration complementary to that defined by the cigarette lighter receptacle. A metallic core extends from interiorly of the polymeric base to a shank provided with an orthogonally oriented clip member. The clip member defines a generally "U" shaped slot for receiving a complementary tab in a sliding relationship of an accessory support utilized with the tab. The accessories include an insulated cup holder, a map holder, and a tray, each selectively receivable within the "U" shaped slot. The metallic shank may be pivotally mounted to accommodate cigarette lighter receptacles of non-horizontal alignment relative to an associated dash of the automotive vehicle.

16 Claims, 5 Drawing Sheets

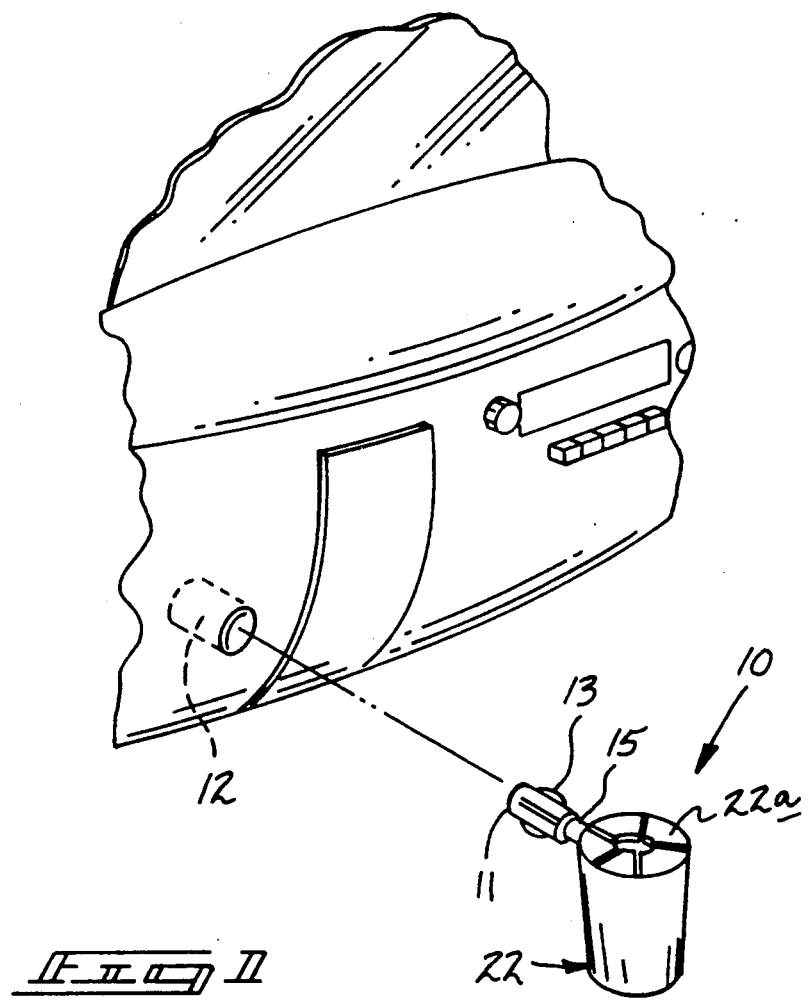

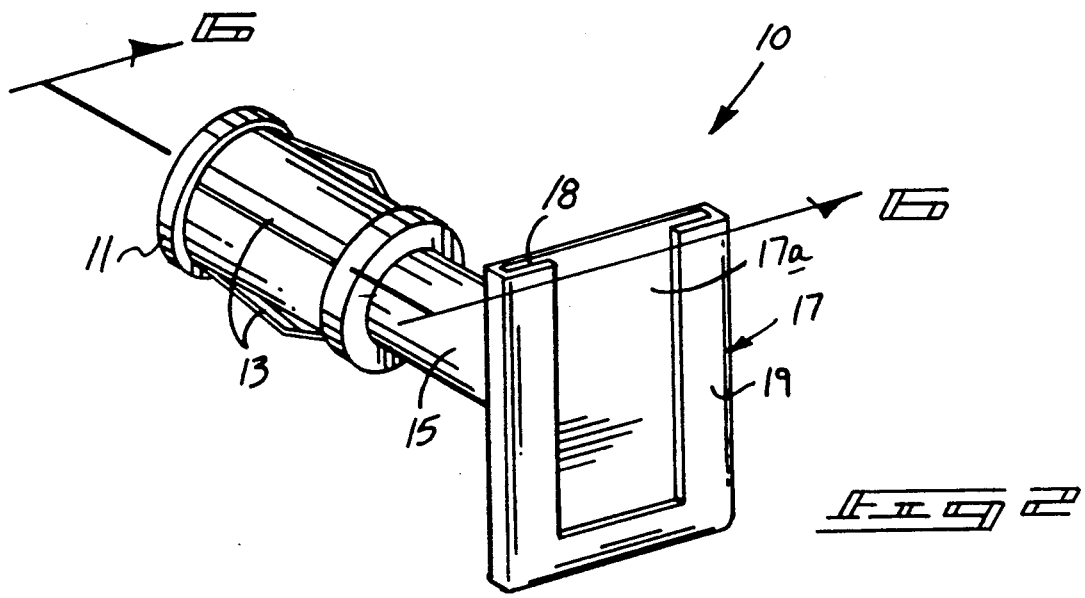
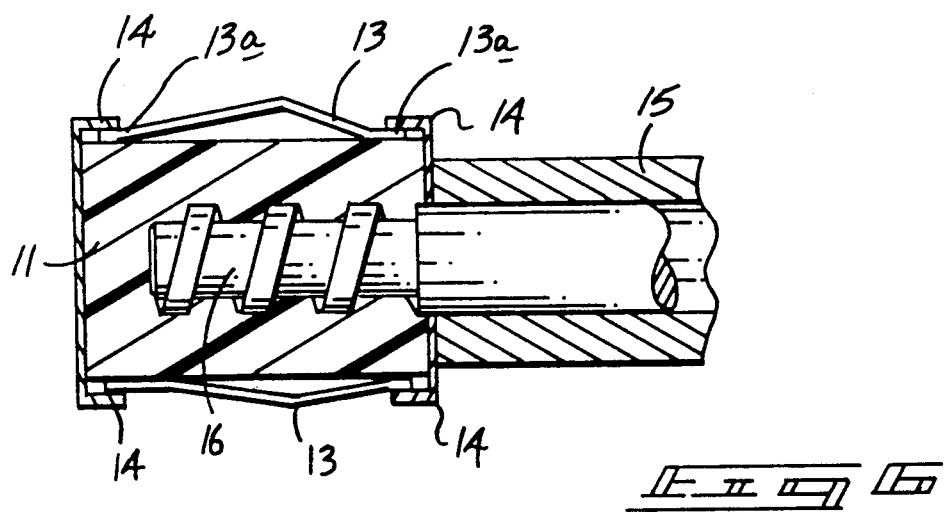

AUTOMOTIVE ACCESSORY MOUNT

BACKGROUND OF THE INVENTION

1. Field of the Invention

The field of invention relates to automotive accessory devices, and more particularly pertains to a new and improved automotive accessory mount wherein the same enables convenient storage of accessory items utilized in automotive travel.

2. Description of the Prior Art

Vehicular accessory mounts for securement of items such as cups, maps, and the like have been utilized in the prior art. The apparatus has been utilized for securement to various portions of an automotive environment to enable temporary storage of such items conveniently. Examples of prior art devices include U.S. Pat. No. 3,842,281 to Limbert providing a beverage mount that is pivotally mounted to a shank that in turn is secured relative to a vertical support such as a window and the like.

U.S. Pat. No. 4,724,986 to Kahn provides a beverage receptacle holder for mounting to an interior of a passenger vehicle wherein the same is mounted to a cigarette lighter receptacle and a forward surface of the dash board by an interrelated linkage arrangement of a relatively complex and remote organization to that of the instant invention to enable securement of a single beverage containing support.

U.S. Pat. No. 4,294,384 to Howell sets forth a liquid dispenser formed with a surrounding cradle for securement interiorly of a vehicle.

U.S. Pat. No. 4,303,109 to Cohen provides a beverage containing support that is mounted by means of securement legs to an upper and forward surface of an associated dash board of a vehicle.

U.S. Pat. No. 4,535,923 to Manke provides an automotive beverage holding device for clipping onto a forward portion of an ash tray or glove compartment door when such door is fully opened.

As such, it may be appreciated that there is a continuing need for a new and improved automotive accessory mount to enable securement of a variety of accessory items as used in automotive travel and in this respect, the present invention substantially fulfills this need.

SUMMARY OF THE INVENTION

In view of the foregoing disadvantages inherent in the known types of automotive accessory mounts now present in the prior art, the present invention provides an automotive accessory mount wherein the same is selectively positionable and received within a cigarette socket of an automobile passenger compartment and has selectively secured thereto one of a series of accessory items. As such, the general purpose of the present invention, which will be described subsequently in greater detail, is to provide a new and improved automotive accessory mount which has all the advantages of the prior art automotive accessory mounts and none of the disadvantages.

To attain this, the present invention includes an elongate, cylindrical base of a complementary configuration to that defined by a cigarette lighter receptacle bore within a dash board of an automobile formed of polymeric material including a rigidly aligned shank member with a clip orthogonally secured thereto. The clip includes a "U" shaped slot for receiving a securement plate of various accessory items, such as an insulated cup, a tray, and a map holder. An embodiment of the instant invention includes an adjustment means with a first and second relatively rotatable portion to enable rotation of the clip relative to the cylindrical base to position the clip in a vertical orientation when the cigarette lighter receptacle bore is in a non-horizontal orientation.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive accessory mount which has all the advantages of the prior art automotive accessory mounts and none of the disadvantages.

It is another object of the present invention to provide a new and improved automotive accessory mount which may be easily and efficiently manufactured and marketed.

It is a further object of the present invention to provide a new and improved automotive accessory mount which is of a durable and reliable construction.

An even further object of the present invention is to provide a new and improved automotive accessory mount which is susceptible of a low cost of manufacture with regard to both materials and labor, and which accordingly is then susceptible of low prices of sale to the consuming public, thereby making such automotive accessory mounts economically available to the buying public.

Still yet another object of the present invention is to provide a new and improved automotive accessory mount which provides in the apparatuses and methods of the prior art some of the advantages thereof, while simultaneously overcoming some of the disadvantages normally associated therewith.

Still another object of the present invention is to provide a new and improved automotive accessory mount wherein the same is selectively securable within a cigarette lighter receptacle bore for securement of various accessory items thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention and its relationship to an automotive cigarette lighter receptacle bore.

FIG. 2 is an enlarged isometric illustration of the accessory mount.

FIG. 6 is a cross sectional view of the base and shank member of the accessory mount.

DESCRIPTION OF THE PREFERRED EMBODIMENT

Figure 3:
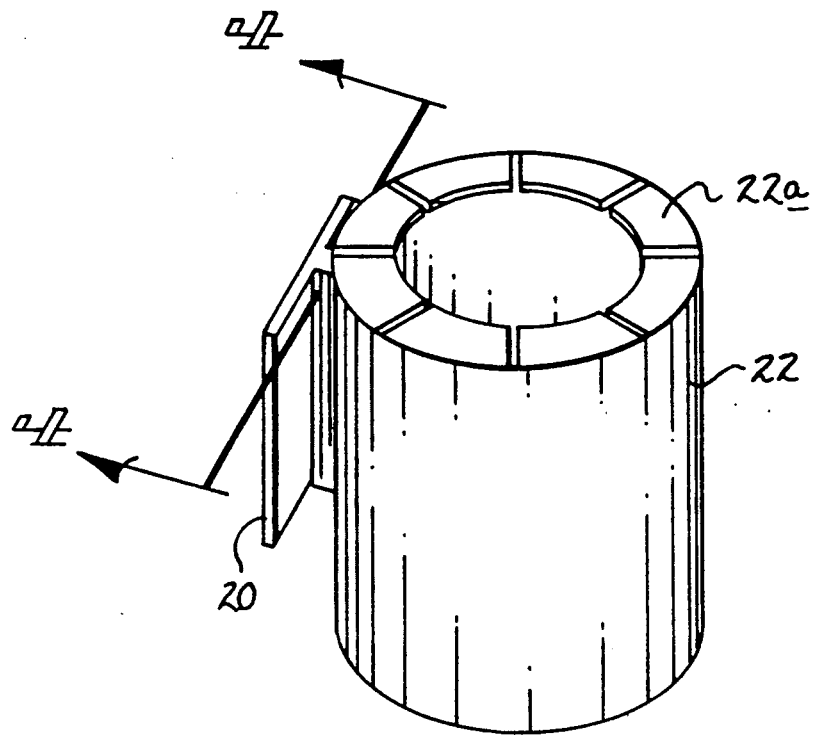
FIG. 3 is an isometric illustration of a first accessory securable to the accessory mount.
Figure 4:
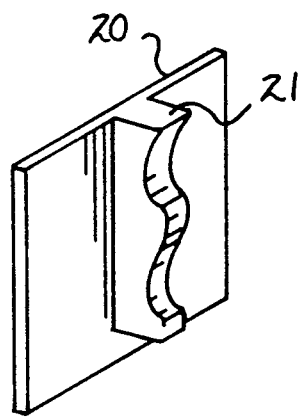
FIG. 4 is an orthographic view taken along the lines 4—4 of FIG. 3 in the direction indicated by the arrows.

With reference now to the drawings, and in particular to FIGS. 1 to 7 thereof, a new and improved automotive accessory mount embodying the principles and concepts of the present invention and generally designated by the reference numeral 10 will be described.

More specifically, the automotive accessory mount apparatus 10 essentially comprises an elongate, cylindrical base portion 11 of an axial length and diameter to define a configuration complementary to define a configuration complementary to that defined by a conventional cigarette lighter receptacle bore 12 formed within a dash board of a typical automotive vehicle, as illustrated in FIG. 1. The cylindrical base 11 is formed of a polymeric, non-electrically conductive material that includes an array of coaxially aligned polymeric arcuate springs 13 extending exteriorly of the elongate surface of the base 11. Each of the springs are formed with terminal end feet portions 13a that are slidably received within slots 14 formed within the base 11 in forward and rear end portions thereof and extending interiorly of the surface of the base 11 to accommodate the springs and their contraction upon insertion of the base 11 within the cigarette lighter receptacle 12. A rigid shank member 15 formed preferably of a metallic material is of a diameter substantially equal to that of the base 11 to define a continuous external surface in alignment with the external surface of the base 11. The rigid shank member includes a ribbed core 16 extending coaxially of the shank member 15 and of the base 11 extending interiorly of the base 11 to maintain the shank member 15 in alignment with the base member 11.

Figure 5:
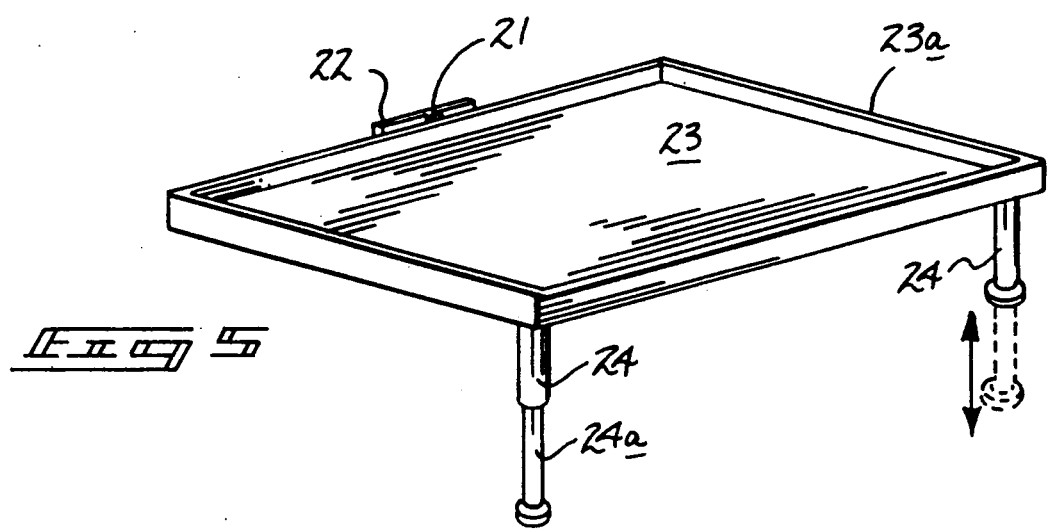
FIG. 5 is an isometric illustration of a tray accessory utilized by the instant invention.
Figure 7:
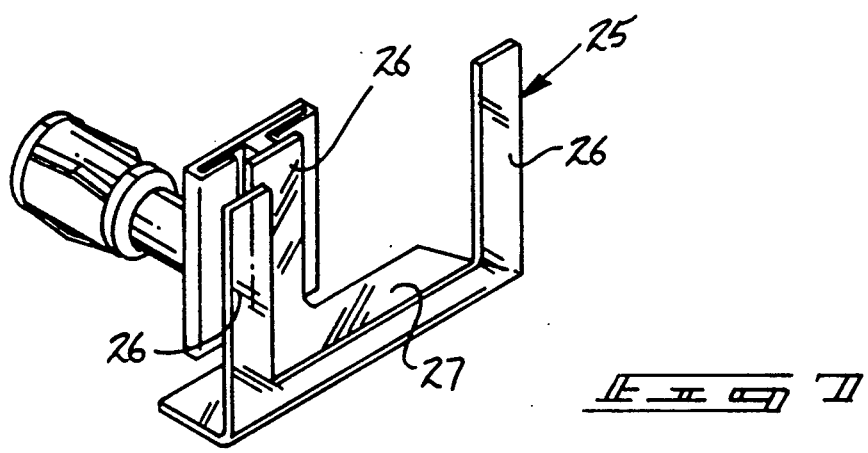
FIG. 7 is an isometric illustration of a map holder securable to the accessory mount of the instant invention.

Reference to FIG. 2 illustrates the securement clip 17 of the instant invention with a rear surface orthogonally aligned relative to the base 11 and shank member 15. A "U" shaped slot 18 is defined about a perimeter of the side and bottom portions of the forward surface 17a of the clip 17 defined by an overfolded continuous flange 19 extending and overlying the forward surface 17a of the clip about side and bottom portions thereof. The clip 17 slidably receives therein a tab plate 20 integrally and orthogonally secured to a connecting rib 21 positioned medially of a rear surface of the tab plate 20 and extending from an upper edge of the tab plate 20 to a distance spaced above a lower edge of the tab plate 20 a distance equal to the depth of the slot 18 to completely accommodate the tab plate 20 within the slot 18. The connecting rib 21 is in turn integrally secured to an accessory item, such as illustrated in FIGS. 3, 5, and 7. FIG. 3 is illustrative of an insulated cup 22 with an external cylindrical configuration including a polymeric insulated interior surface 22a. FIG. 5 illustrates a tray 23 formed with a planar upper surface and including a perimeter flange 23a extending orthogonally and upwardly of the edge perimeter defined by the tray 23. The tray 23 further includes telescoping legs 24 formed at forward corners of the tray with a bottom leg portion 24a frictionally received within an upper leg portion to enable the legs 24 to extend to a floor portion of an associated interior of an automobile to provide stability to the tray in use. FIG. 7 is illustrative of a transparent map holder 25 utilizing a plurality of finger portions 26 extending upwardly and orthogonally relative to a horizontal base 27. The horizontal base 27 is orthogonally and fixedly secured to a support flange 28 which is in turn integrally secured to an associated connector 21 of the tab plate 20.

Figure 8:
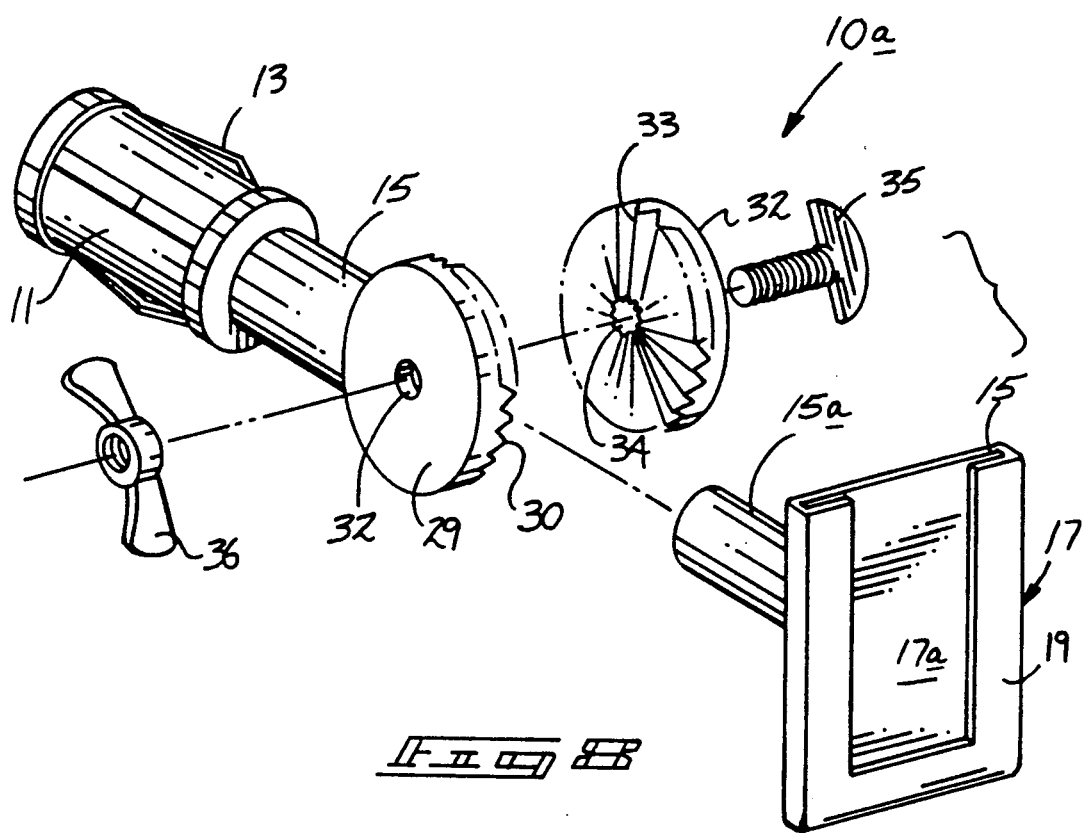
FIG. 8 is an isometric exploded view of a further embodiment of the accessory mount of the instant invention.

Reference to FIG. 8 illustrates a further embodiment of an automotive accessory mount 10a including a first cylindrical adjustment member 29 formed with first radial teeth portions 30 formed integrally upon a rear face of the member 29 and further including a first axial bore 31. The first cylindrical adjustment member 29 cooperates with a second cylindrical adjustment member 32 that includes a second matrix of radial teeth portions 37 formed on a forward face of the second adjustment member 32. The second adjustment member 32 further includes a second axial bore 34 aligned with the first axial bore 31. A threaded securement bolt 35 formed with an enlarged head of a diameter greater than that of the axial bores 31 and 34 is formed with a shank of a diameter substantially equal to that of the axial bores 31 and 34 receivable therethrough and cooperates with a wing nut 36 to thereby secure the first and second respective adjustment members 29 and 32 together in a fixed, relatively rotative position. As illustrated, the first adjustment member 29 is integrally and diametrically secured to the shank member 15 wherein the second adjustment member 32 includes a diametrically aligned second shank member 15a wherein the securement clip 17 is secured orthogonally thereto in a manner and for purposes as discussed above. The automotive accessory mount 10a is particularly adaptable for use in association with cigarette lighter receptacle bores that are not horizontally aligned relative to an interior of an automobile whereby rotation of the first and second adjustment members 29 and 32 enables the clip 17 to be positioned at a vertical orientation to position an accessory, such as the cup 22, the tray 23, or the map holder 27, in a desired orientation.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automotive accessory apparatus in combination with an automotive cigarette lighter receptacle secured within a vehicular dash board wherein the receptacle is defined by a bore of a predetermined internal configuration, wherein the apparatus comprises, an elongate base of an external configuration substantially equal to the predetermined internal configuration of the bore of the receptacle, and an elongate shank member axially secured to and extending exteriorly from the cylindrical base and terminating in a forward end, a clip member orthogonally secured relative to the shank member on a rear face of the clip member and including a slot formed on the forward face of the clip member, and a plurality of accessory members, and a tab plate slidably receivable within the slot and the tab plate integrally connected to one of said plurality of accessory members, and wherein the cylindrical base is formed of an electrically insulative polymeric material, and further including a series of arcuate springs coaxially aligned with the cylindrical base and extending exteriorly of an external surface defined by the cylindrical base, and the arcuate springs each include terminal ends, each terminal end of the arcuate springs are receivable within a base slot formed to the external surface of the cylindrical base for frictional engagement with the bore of the cigarette lighter receptacle.

2. An automotive accessory apparatus as set forth in claim 1 wherein the shank member is of a diameter substantially equal to a further diameter defined by the cylindrical base to define a shank member external surface coextensive with the external surface of the cylindrical base, and further including a ribbed core coaxially aligned with the shank member and extending coaxially and interiorly of the base member for securement of the shank member relative to the base member.

3. An automotive accessory apparatus as set forth in claim 2 wherein the slot formed on the clip member is defined as a "U" shaped slot formed by a flange portion overlying side and bottom edges of the forward surface of the clip member.

4. An automotive accessory apparatus as set forth in claim 3 wherein the tab plate defines an external surface of complementary configuration to an internal surface defined by the "U" shaped slot.

5. An automotive accessory apparatus as set forth in claim 4 wherein the tab plate includes a rib portion integrally secured to the tab plate extending orthogonally therefrom, wherein the rib portion is medially positioned relative to a forward surface of the tab plate and extends from a top edge of the tab plate to a fixed distance space above a bottom edge of the tab plate, wherein the fixed distance is substantially equal to a depth defined by the flange of the "U" shaped slot.

6. An automotive accessory apparatus as set forth in claim 5 wherein the plurality of accessory members includes a first accessory member formed as an insulated cylindrical cup-shaped member integrally secured to the rib portion.

7. An automotive accessory apparatus as set forth in claim 6 wherein a second accessory member defined as a planar tray integrally secured to the rib portion and includes an upwardly extending perimeter flange and telescoping legs orthogonally secured to forward corners defined by the tray wherein the telescoping legs include a first leg frictionally received within a second leg.

8. An automotive accessory apparatus as set forth in claim 7 wherein a third accessory member defined as a map holder, wherein the map holder includes a series of vertically oriented transparent legs integrally secured to a horizontal transparent base member, the transparent base member orthogonally secured to a flange, and the flange integrally secured to the rib portion.

9. An automotive accessory apparatus in combination with an automotive cigarette lighter receptacle secured within a vehicular dash board wherein the receptacle is defined by a bore of a predetermined internal configuration, wherein the apparatus comprises, an elongate cylindrical base of an external predetermined configuration substantially equal to the predetermined internal configuration of the bore of the receptacle, and an elongate shank member axially secured to and extending exteriorly from the cylindrical base and terminating at a forward end, a clip member orthogonally secured relative to the shank member on a rear face of the clip member and including a slot formed on the forward face of the clip member, a tab plate slidably receivable within the slot and the tab plate integrally connected to an accessory member, and wherein the cylindrical base is formed of an electrically insulative polymeric material, and further including a series of arcuate springs coaxially aligned with the cylindrical base and extending exteriorly of an external surface defined by the cylindrical base, and the arcuate springs each include terminal ends, each terminal end of the arcuate springs are receivable within a base slot formed to the external surface of the cylindrical base for frictional engagement with the bore of the cigarette lighter receptacle.

10. An automotive accessory apparatus as set forth in claim 9 wherein the shank member is of a diameter substantially equal to a further diameter defined by the cylindrical base to define a shank member external surface coextensive with the external surface of the cylindrical base, and further including a ribbed core coaxially aligned with the shank member and extending coaxially and interiorly of the base member for securement of the shank member relative to the base member.

11. An automotive accessory apparatus as set forth in claim 10 wherein the slot formed on the clip member is defined as a "U" shaped slot formed by a flange portion overlying side and bottom edges of the forward surface of the clip member.

12. An automotive accessory apparatus as set forth in claim 11 wherein the tab plate defines an external surface of complementary configuration to an internal surface defined by the "U" shaped slot.

13. An automotive accessory apparatus as set forth in claim 12 wherein the tab plate includes a rib portion integrally secured to the tab plate extending orthogonally therefrom, wherein the rib portion is medially positioned relative to a forward surface of the tab plate and extends from a top edge of the tab plate to a fixed distance spaced above a bottom edge of the tab plate, wherein the fixed distance is substantially equal to a depth defined by the flange of the "U" shaped slot.

14. An automotive accessory apparatus as set forth in claim 13 wherein the accessory member is an insulated cylindrical cup-shaped member integrally secured to the rib portion.

15. An automotive accessory apparatus as set forth in claim 13 wherein the accessory member is a planar tray integrally secured to the rib portion and includes an upwardly extending perimeter flange and telescoping legs orthogonally secured to forward corners defined by the tray wherein the telescoping legs include a first leg frictionally received within a second leg.

16. An automotive accessory apparatus as set forth in claim 13 wherein the accessory member is defined by a map holder, wherein the map holder includes a series of vertically oriented transparent legs integrally secured to a horizontal transparent base member, the transparent base member orthogonally secured to a flange, and the flange integrally secured to the rib portion.

* * * * *